G. S. DOWELL.
LUGGAGE CARRIER.
APPLICATION FILED DEC. 2, 1915.
1,181,377.
Patented May 2, 1916.
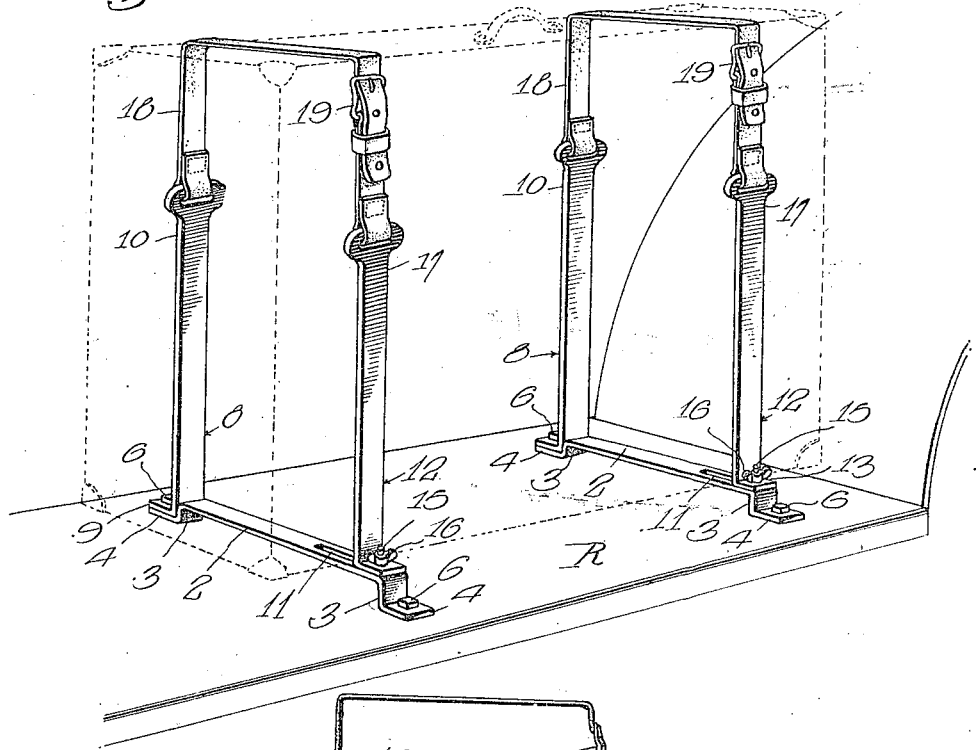
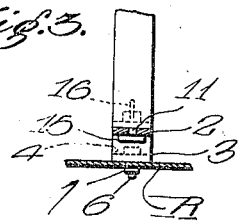
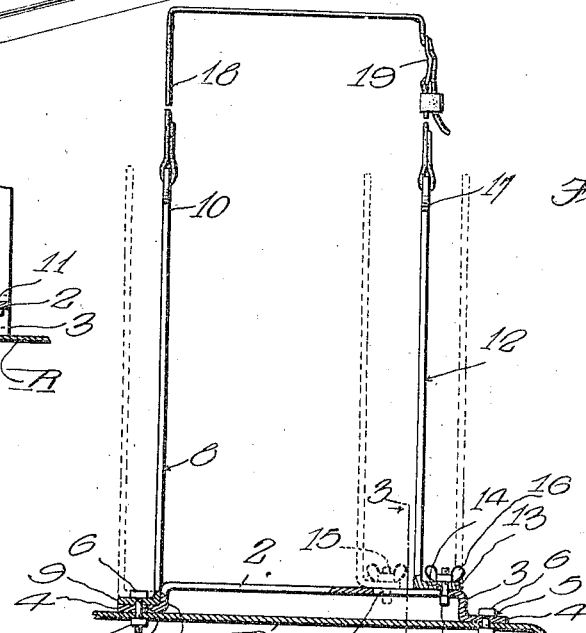
Inventor
George S. Dowell
By H. B. Willson & Co.
Attorneys
Witnesses
H. Woodard

UNITED STATES PATENT OFFICE.

GEORGE S. DOWELL, OF BRAYMER, MISSOURI.

LUGGAGE-CARRIER.

1,181,377.  Specification of Letters Patent.  Patented May 2, 1916.

Application filed December 2, 1915. Serial No. 64,768.

*To all whom it may concern:*

Be it known that I, GEORGE S. DOWELL, a citizen of the United States, residing at Braymer, in the county of Caldwell and State of Missouri, have invented certain new and useful Improvements in Luggage-Carriers; and I do declare the following to be a full, clear, and exact description of the invention, such as will enable others skilled in the art to which it appertains to make and use the same.

This invention relates to new and useful improvements in luggage carriers and the primary object of the invention is to provide a device of this character which is adapted to be arranged on vehicles, such as automobiles and the like.

Another object of the invention is to provide an adjustable luggage carrier adapted to be mounted on the running board of a vehicle, such as an automobile or the like, for carrying small trunks or suitcases, so as to secure them against accidental displacement or loss.

Another object of the invention is to provide a luggage carrier of this character, whereby when the trunks or suitcases are secured in position they will be spaced from the running board of the vehicle, and also the carrier when not in use is adapted to be folded together.

A further object of the invention is to provide a device which is simple and durable in construction, inexpensive to manufacture, and one which will be very efficient in operation.

With these and numerous other objects in view my invention consists of the novel features of construction, combination and arrangement of parts which will be herein referred to and more particularly pointed out in the specification and claims.

In the accompanying drawings: Figure 1 is a perspective view of my invention applied to the running board of an automobile; Fig. 2 is an end view partly in section; Fig. 3 is a vertical transverse section taken on the line 3—3 of Fig. 2.

In describing my invention I shall refer to the drawings in which similar reference characters designate corresponding parts throughout the several views, and in which the letter R in Fig. 1 of the drawings represents the running board of an automobile or light vehicle to which my luggage carrier is adapted to be attached. The luggage carrier is formed in two sections, and owing to the fact that these sections are substantially alike in their details of construction I will, for the sake of brevity, specifically describe only one of them. These sections are spaced on the running board a predetermined distance apart according to the length of the article to be carried thereby.

The luggage carrier consists of a base plate 2 which is formed of a single metallic strip having downturned ends 3 with longitudinally outwardly extending extremities 4. These extremities 4 are apertured as shown at 5 to receive bolts 6 which are secured by nuts 7 in position through the apertures in the extremities of the base plate and alining apertures in the running board R. By this means, these bolts being positioned at either end of the base member of the carrier, the same is secured transversely across the running board in locked position thereto, and it will be noticed that owing to the construction of the base above described, the same is formed with an up-struck central portion, upon which the article to be carried is adapted to rest.

The base member 2 has positioned on one of its extremities 4 a standard 8 which consists of an upright strip having a laterally projecting attaching foot 9, said foot being of substantially the same length as the length of the extremity 4 of the base member. This attaching foot 9 is centrally apertured to aline with the aperture in the extremity and the running board, so that the same means, that is the bolt 6, that secures them together, will hold the standard in position. This standard 8 is adapted to be reversed, as shown in dotted lines in Fig. 2 of the drawings, by simply loosening the nuts 7, whereby the standard may be easily turned on the bolt 6 to either one of the positions shown in the drawings. This reversible movement is for the purpose of adjusting the carrier to different widths so that a larger or smaller article may be secured in the same. The free end 10 of the standard 8 has formed at the same a transversely extending elongated loop for a purpose to be hereinafter more fully described.

The base member 2 of the carrier has a longitudinally extending slot 11 therein adjacent one of its ends. This slot 11 is disposed opposite the end or extremity to which the standard 8 is secured, and disposed above the portion of the base 2 in which said slot is positioned, is an additional standard 12 which is substantially alike or similar to the standard 8, only being slightly shorter in proportion thereto, so that in spite of the fact that it is positioned at the top of the up-struck portion of the base 2, the free ends of said standards will be in the same horizontal plane. This standard 12 has projecting laterally therefrom at its lower end an attaching foot 13 which is centrally apertured as shown at 14, so that a T-bolt 15 which is adapted to project upwardly through the slot 11 and the aperture 14, may hold this foot secured to the upper surface of the base 2, by means of a wing nut 16 that is adapted to be clamped down upon the same.

By means of the wing nut 16 which is removably mounted on the end of the T-bolt 15, the standard 12 may be moved longitudinally along the base 2, and be secured to the same at any desired position within the movement allowed the same by the slot 11. This standard 12 is likewise reversible in a manner similar to that in which the standard 8 is reversible, as hereinbefore set forth. The free end 17 of the standard 12 is also provided with a transversely extending elongated loop that corresponds in size and shape to the loop formed at the free end 10 of the standard 8. The free ends of these standards are connected by means of a strap 18, which is made in two sections which have their ends secured in the loops in the free ends of the two standards, and have their opposite ends adjustably connected by means of a buckle 19. By this means, articles of various heights may be secured between the standards 8 and 12, making this carrier vertically adjustable as well as horizontally.

By the above described construction I have provided a very simple and efficient form of luggage carrier that is easily adjusted vertically or horizontally, to secure various heights and widths of suitcases or small trunks thereby, so that when this device is placed upon the running board of a vehicle and an article placed therein, the same may be easily carried without any danger of accidental displacement and consequential loss or damage. This device may be easily knocked down and folded, and carried in a very small space. Owing to the upstruck central portion or section of the base member 2 of the carrier, the article that is carried thereby will be spaced from the top of the running board, thereby obviating any danger of the same being soiled by contact with the surface of said running board. The standard 8 of this device is also secured in upright position owing to the fact that a portion of the same, no matter in what position it is placed, will abut with the downturned end 3 of the base member 2, thereby forming an additional reinforcing means that will strengthen the standard.

From the foregoing description of the construction of my improved device, the manner of applying the same to use and the operation thereof will be readily understood, and it will be seen that I have provided a simple, inexpensive, and efficient means for carrying out the objects of this invention.

I claim:—

1. A device of the class described comprising a base member having an upstruck central section, a reversible standard at one end of the same with an attaching foot having a portion engaging the shoulder formed by said upstruck section of the base member, a longitudinally adjustable reversible standard at the opposite end of said section, and a flexible adjusting strap connecting the free ends of said standards.

2. A device of the class described comprising a base member having down-turned ends with longitudinal outwardly extending extremities, said member having a longitudinally extending slot adjacent one end, a standard at said end of the member, said standard having a laterally projecting attaching foot at its lower end with an aperture therethrough alining with the slot in the member, a T-bolt projecting upwardly through said slot and aperture, a wing nut on said bolt, a standard at the opposite extremity of the base member, and a flexible adjustable strap connecting the free ends of said standards.

3. A device of the class described comprising a base member formed of a metallic strap with down-turned ends and longitudinal outwardly extending extremities, a standard with a laterally projecting attaching foot secured to one of the extremities of said base member, said foot having a portion abutting the downwardly extending end of the base, said base member having a longitudinally extending slot adjacent its opposite end, a standard secured to said end, means to adjust said standard along said slot, the free ends of the standards having transversely extending elongated loops formed in the same, and a flexible adjustable strap engaging said loops and connecting the free ends of the standards.

In testimony whereof I have hereunto set my hand in presence of two subscribing witnesses.

GEORGE S. DOWELL.

Witnesses:
A. E. STILLWELL,
KATHLEEN MESSENBAUGH.